J. E. MARSDEN.
WEATHERPROOFING STRUCTURE.
APPLICATION FILED OCT. 6, 1915.

1,249,651.

Patented Dec. 11, 1917.
2 SHEETS—SHEET 1.

Inventor
John E. Marsden
By Cornelius D. Ehret
his Attorney

J. E. MARSDEN.
WEATHERPROOFING STRUCTURE.
APPLICATION FILED OCT. 6, 1915.
1,249,651.
Patented Dec. 11, 1917.
2 SHEETS—SHEET 2.
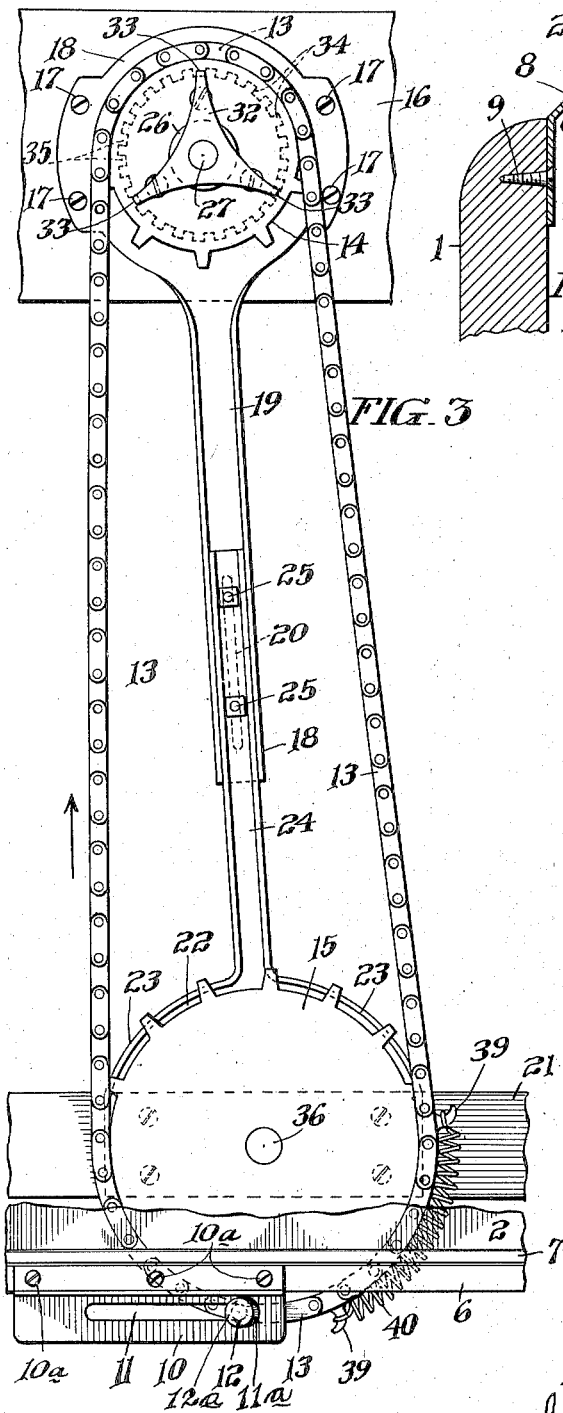
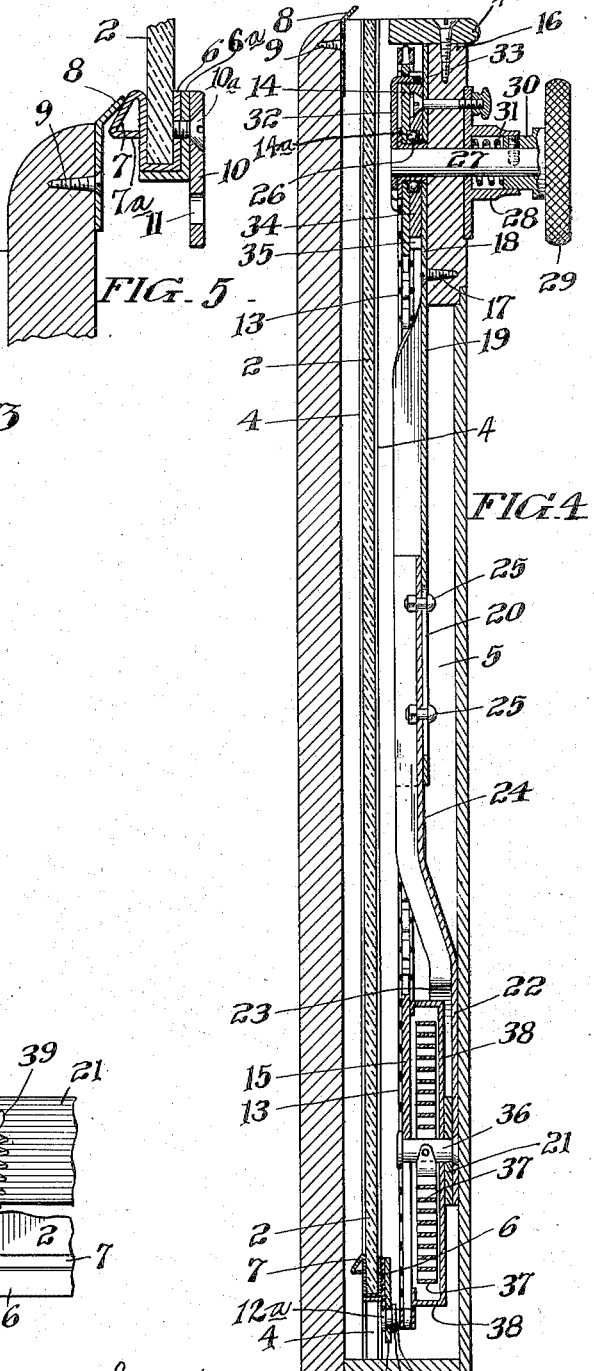
Inventor:
John E. Marsden
By Cornelius D. Ehret
his Attorney

UNITED STATES PATENT OFFICE.

JOHN E. MARSDEN, OF PHILADELPHIA, PENNSYLVANIA.

WEATHERPROOFING STRUCTURE.

1,249,651.     Specification of Letters Patent.     Patented Dec. 11, 1917.

Application filed October 6, 1915. Serial No. 54,353.

*To all whom it may concern:*

Be it known that I, JOHN E. MARSDEN, a citizen of the United States, residing in the city of Philadelphia, county of Philadelphia, and State of Pennsylvania, have invented a new and useful Weatherproofing Structure, of which the following is a specification.

My invention relates to means for weatherproofing a window member, and more particularly a vehicle window member, as of a carriage, automobile, or the like.

For an illustration of one of the various forms my invention may take, reference is to be had to the accompanying drawings, in which:

Fig. 3 is a side elevational view, on larger scale, of the mechanism for actuating the window member shown in its lowermost position.

Fig. 4 is a vertical sectional view, on enlarged scale, through the window pocket and the actuating mechanism located therein.

Fig. 5 is a sectional fragmentary view, on enlarged scale, showing the weather proofing device.

Figure 1:
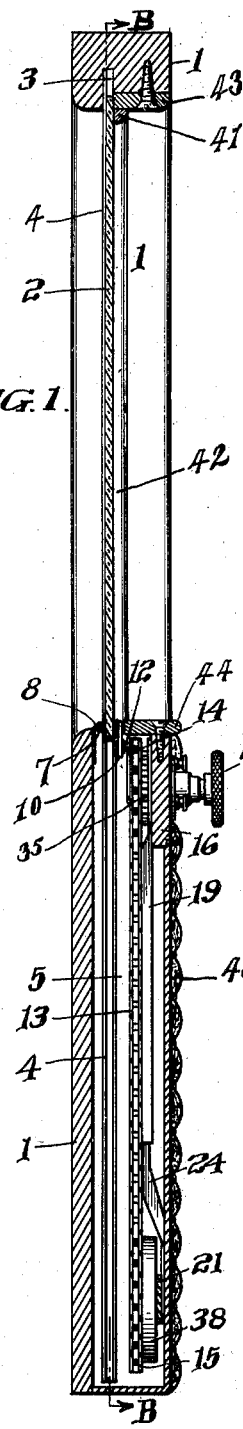
Figure 1 is a vertical sectional view, some parts in elevation, taken on the line A—A of Fig. 2.

Referring to the drawings, 1 represents a window casing or frame, such as an automobile door, or any other suitable frame, in which the window-pane 2 is slidable vertically in the lateral guide slots 3 suitably lined by cloth or metal member 4. In the lower part of the window frame or automobile door is a pocket 5 into which the window member 2 may be lowered and in which the actuating mechanism therefor is housed. Within the pocket 5, member 4 is shown as a metal channel, while in the frame above the pocket it is shown as a metal angle or channel with one flange omitted for purposes hereinafter stated.

On the lower edge of the window member 2 is disposed a channel member 6 extending across the window member 2 and having its outer flange formed into the inclined transversely extending lip 7 adapted to engage, when the window is fully closed, the transversely extending inclined strip 8 secured as by screws 9, Fig. 5, to a part of the frame 1. In Fig. 5 these parts are shown on larger scale. The lip 7 and the strip 8 are shown inclined at different angles and the strip 8 being of yielding or springy metal, for example, phosphor bronze, the engagement of the strip 8 by the lip 7 causes the strip 8 to yield under the pressure exerted on its under side by the lip 7 to cause the lip 7 and strip 8 to closely contact each other throughout their length to form a rain proof or weather proof joint. The lip 7 may have the extension 7ª bent in against the channel 6 to prevent yielding of lip 7 when engaging strip 8. It will be understood that the member 7 may also be made of material which will yield or spring substantially when brought into engagement with the strip 8, which may also be substantially rigid, particularly when the lip 7 is flexible or yielding.

To the channel 6 is permanently secured by welding or detachably secured by screws 10ª the member or bracket 10 having the closed slot 11 which in the example illustrated is shown as horizontal. At its right end, Figs. 2 and 3, the slot 11 has the enlargement 11ª. A plate or member 6ª may intervene between channel 6 and plate 10.

In the slot 11 engages the pin 12 having the shoulders 12ª and 12ᵇ on opposite sides of the plate 10. Pin 12 is attached to the sprocket chain 13 which passes over the upper sprocket wheel 14 and the lower sprocket wheel 15. On the transversely extending window frame strip 16 at the upper end of the pocket 5 is secured as by screws 17 the flat metallic head 18 which has the downwardly projecting channel-shaped extension 19 slotted at 20. And on the transversely extending strip 21 at or near the bottom of the pocket 5 is secured the flat metallic head 22 having an upturned flange 23, the member 22 having the upwardly extending channel-shaped projection 24 adapted to fit into the channel 19 and to be clamped thereto by the bolts 25 extending through holes in the member 24 and through the slot 20, this form of connection permitting adjustment of the length between the centers of the heads 18 and 22.

The bearing sleeve or eyelet 26 through which extends the handle shaft 27 confines the sprocket 14, slotted plate 34 and head 18 in coöperative relation, and a ball bearing 14ª is provided for sprocket 14. Shaft 27 extends through the strip 16 to the inside of the door or window frame and through the sleeve member 28 secured upon the strip 16. On the inner end of the shaft 27 is secured the turning knob or handle 29 having a collar 30 having a sliding fit in the sleeve 28 in which is disposed a spring 31 which opposes inward movement of the handle 29 toward the left, as viewed in Fig. 4. On its inner end there is secured to the shaft 27 to be rotated thereby in fixed relation thereto the three-armed member 32 having inturned ends 33 extending through apertures in the sprocket wheel 14 to engage the same and rotate it in fixed relation with respect to shaft 27 which may, however, move laterally with respect to sprocket 14. Between the sprocket wheel 14 and the head 18 is confined the plate 34 having the locking notches 35 around its circumference in which ends 33 of member 32 may engage for locking.

Secured to the lower head 22 is the pin 36 to which is secured the inner end of a spiral counterbalancing spring 37 whose outer end is connected to the casing 38 to which is secured the lower sprocket 15 which rotates upon the pin 36. The sprocket chain 13 is provided with means for taking up its slack or lost motion. On two links at suitable distance from each other are provided the hooks or projections 39 to which are connected the ends of spring 40 which is under tension and therefore draws the projections or hooks 39 toward each other, thus taking up the slack of the chain 13 and preventing lost motion in the chain, whereby a smooth window driving action is procured and intermediate response when shaft 27 is turned.

As shown in Fig. 3, this construction for taking up the slack of a chain does not interfere with the coöperation of the chain with the sprocket wheel, the hooks or projections 39 being on the outer side of the chain and the spring 40 lying against the chain in a circular arc as the chain lies against the sprocket wheel.

The operation is as follows:

With the parts in the position shown in Figs. 3 and 4, the window member 2 is in its lowermost position.

To raise the member 2 the operator presses inwardly toward the left, Fig. 4, upon the handle 29 in opposition to spring 31, thereby lifting the locking and driving projections 33 upon the member 32 out of the locking slots 35 in the plate 34, whereupon the operating mechanism is in the unlocked condition and by turning the knob 29 the turning movement is immediately communicated to the upper sprocket wheel 14 by the driving projections 33, which always engage in the holes in the sprocket wheel 14 and are movable laterally therein. The rotation of the upper sprocket wheel 14 drives the chain in the direction of the arrow, Fig. 3, the chain carrying with it the pin 12 attached thereto and engaging in the slot 11 of the member 10 attached to the window member 2. As the chain 13 is driven by the upper sprocket wheel 14 it also rotates the lower sprocket wheel 15.

The pin 12 moves gradually toward the left in the slot 11, Fig. 3, and in so doing starts to raise the member 2. When that part of the chain to which the pin 12 is attached leaves the lower sprocket wheel 15, the pin 12 is at or near the left end of the slot 11 and the pin continues to rise toward the sprocket wheel 14 and in so doing raises the member 2.

Figure 2:
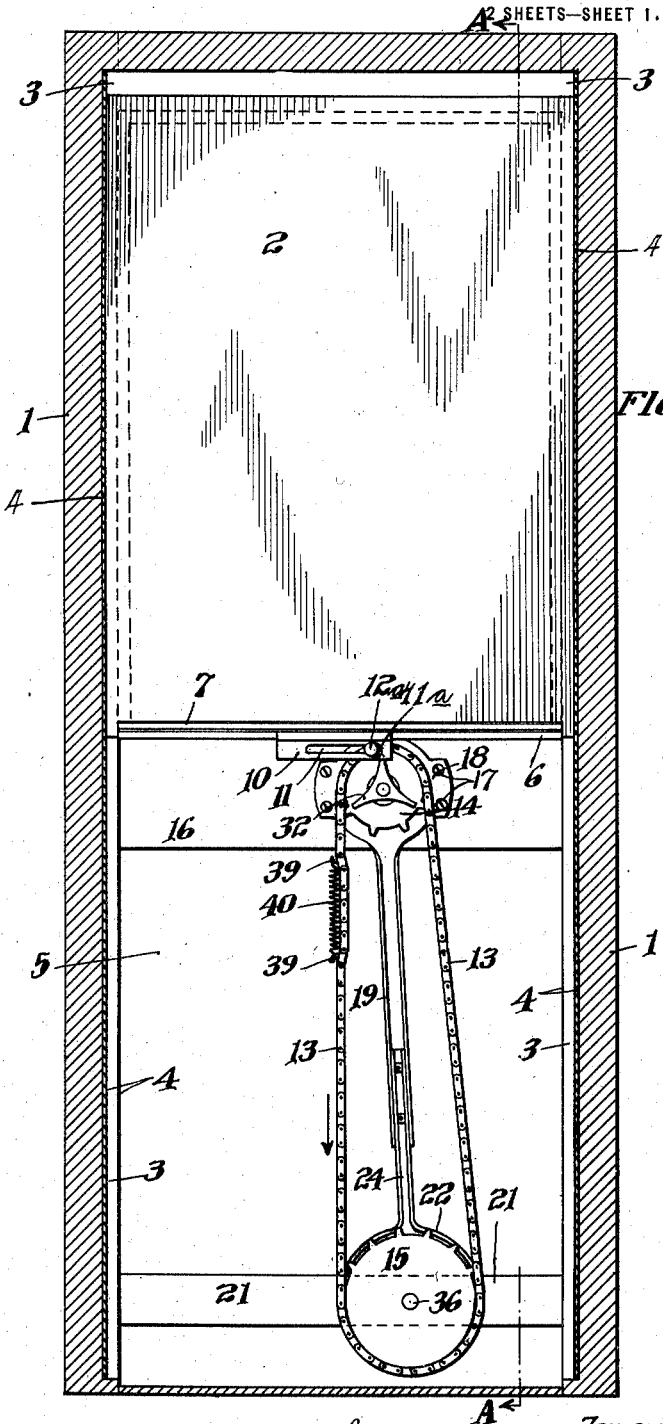
Fig. 2 is a vertical sectional view, some parts in elevation, taken on the line B—B of Fig. 1.

Toward the end of the window closing movement, that part of the chain 13 to which the pin 12 is attached engages the upper sprocket wheel 14 and is moved around the same to the position shown in Fig. 2, the pin 12 during this latter part of the movement moving from the left toward the right end of the slot 11, as viewed in Fig. 2.

During this final movement of the member 2 the pin 12 in moving toward the right in the slot 11 rises more and more slowly and therefore with a given torque or turning force applied to the handle 29 a greater and greater lifting force is applied to the member 2 at and near its final closing position, this greater raising force applied to the window-pane serving to more easily firmly engage the lip 7 against the weather strip 8 to make a weather-tight joint between them.

When this closing movement has been completed the operator releases the inward pressure upon the handle 29 and the spring 31 moves the shaft 27 toward the right, as viewed in Fig. 4, carrying the locking projections 33 upon the member 32 into locking slots 35 to thereby lock the window in its closed weather-tight position.

To lower the member 2 the handle 29 is again pressed inwardly and the window member lowered completely or to any desired point, it being understood that the locking devices comprising the projections 33 and locking slots 35 permit locking the window member in its fully closed or fully opened position, or any intermediate position.

In lowering the member 2 the sprocket 15 is driven as before by the chain 13 and this rotation of the sprocket 15 winds up the counterbalancing spring 38 which is wound to its greatest tension when the member 2 is in its lowermost position. Subsequent raising of the member 2 is therefore made the easier because of the driving force of the spring 38 in unwinding which assists the operator in raising the member 2, or itself raises the window member if it has been wound up sufficiently.

The slack or lost motion in the chain 13 being taken up as by the structure described, there is no free or lost motion of the handle 29 when the operating mechanism is unlocked; and immediately the operating mechanism is unlocked the turning movement imparted to the handle 29 is immediately responded to by movement of the member 2.

While a sprocket chain coöperating with sprocket wheels is preferably used as in the operating mechanism, it will be understood that a belt of any form, of which the chain 13 is one form, may be employed to actuate the pin 12 which in turn coöperates with the slotted member for operating the window member.

In the upper part of the window frame 1, above the pocket 5, one flange of the channel 4 may be omitted, that flange on the inside of the frame being omitted as shown in Fig. 1. To confine or guide the member 2 are provided the removable wooden or other strip or beading 41 extending across the top of the frame and the similar members 42 secured to the sides of the frame 1. Extending across the top of the frame 1 is a strip 43 which itself may serve the purpose of the strip 41 which latter may be omitted. On the lower horizontal part of the frame 1 is the removable strip 44 secured to the member 16. And upon the inner side of the door or frame 1 on the outer surface of the pocket 5 is the usual upholstering 45 shown in Fig. 1 but omitted from Fig. 4.

By the construction described a window member 2 may be inserted or removed with great facility and in a very short time, and particularly without in any way disturbing the upholstery 45, by removing the strips 41 to 44 inclusive. The removal of the strip 44 exposes the screws 10ª which may then readily be removed, thus detaching the plate 10 from the channel 6. The member 2 may then be withdrawn through the frame 1 toward the right, Fig. 1, the plate 10 having been moved out of the way by slight rotation of the handle 29.

In case the plate 10 is permanently attached to the window member 2, as by welding to the channel 6 or intermediate plate 6ª, which latter may be secured to the channel 6, the handle 29 is actuated until the pin 12 enters the enlargement 11ª in the slot 11, and with the strips 41 to 44 inclusive removed, as above described, tilting inwardly toward the right of the upper part of the window member 2 will move the plate 10 toward the left sufficiently to clear the shoulder 12ª on the pin 12, the enlargement 11ª in such case passing over the shoulder 12ª. The handle 29 may then be slightly actuated to move the pin 12 out of the way and the member 2 lifted out.

By both these modes of operation, the upholstering 45 need not be disturbed nor is access to the pocket through any part of its inside wall necessary and several hours of labor are saved because of the construction allowing quick removal or insertion of a window member 2.

It will further be noted that by the construction hereinbefore described the slot 11 and actuating pin 12 are disposed quite close to the lower edge of the member 2, thus procuring full movement of the window member 2 with a minimum vertical depth of the pocket 5; or, with a given depth of pocket 5 a window member 2 of greater vertical extent may be operated to its fully opened and fully closed positions than with any prior constructions of which I am aware. The nature of the weather proofing construction is such that the window member has no lateral movement with the result that plate 10 is vertically short and of very simple construction.

By my construction the window member 2 in its operation does not move laterally during its vertical movement. And particularly at or near the end of its closing movement the window member 2 continues in a vertical direction without lateral movement, which lateral movement with some constructions of which I am aware is necessary because of the type of weather proofing or stripping employed, the same requiring an upward movement of the window member, then a lateral movement, and then a descending movement. Such complication I have avoided and have nevertheless simplified the weather stripping and procured weather tight construction without lateral movement of the window member.

What I claim is:

1. The combination with a window frame, of a window member movable therein, a metal weather strip secured in fixed relation upon said frame, a metallic channel member engaging one edge of said window member, one side of said channel member being bent to form an inclined lip which engages said weather strip when said window member is in its closed position, said lip having a backwardly extending projection thrusting against the main portion of said channel member, whereby the act of forcing said window member to its closed position will cause said lip to wedge against said weather strip.

2. The combination with a window frame, of a window member movable therein, a metal weather strip secured in fixed relation upon said frame, a metallic channel member engaging one edge of said window member, one side of said channel member being bent to form an inclined lip which engages said weather strip when said window member is in the closed position.

3. The combination with a window frame, of a window member movable therein, a flexible inclined weather strip secured in fixed relation upon said frame, a metallic channel member in which said window member engages, an outwardly inclined lip on said channel member which engages said weather strip and flexes the same when said window member is in closed position, and means attached to said channel member for actuating the same and said window member.

4. The combination with a window frame, of a window member movable therein, a flexible inclined weather strip secured in fixed relation upon said frame, a metallic channel member in which said window member engages, an outwardly inclined lip on said channel member which engages said weather strip and flexes the same when said window member is in closed position, and a projection on said lip extending inwardly toward said channel member.

5. The combination with a window frame, of a window member movable therein, a flexible inclined weather strip secured in fixed relation upon said frame, a metallic channel member in which said window member engages, and an outwardly inclined lip on said channel member which engages said weather strip and flexes the same when said window member is in closed position.

In testimony whereof I have hereunto affixed my signature.

JOHN E. MARSDEN.